United States Patent Office 3,520,444
Patented July 14, 1970

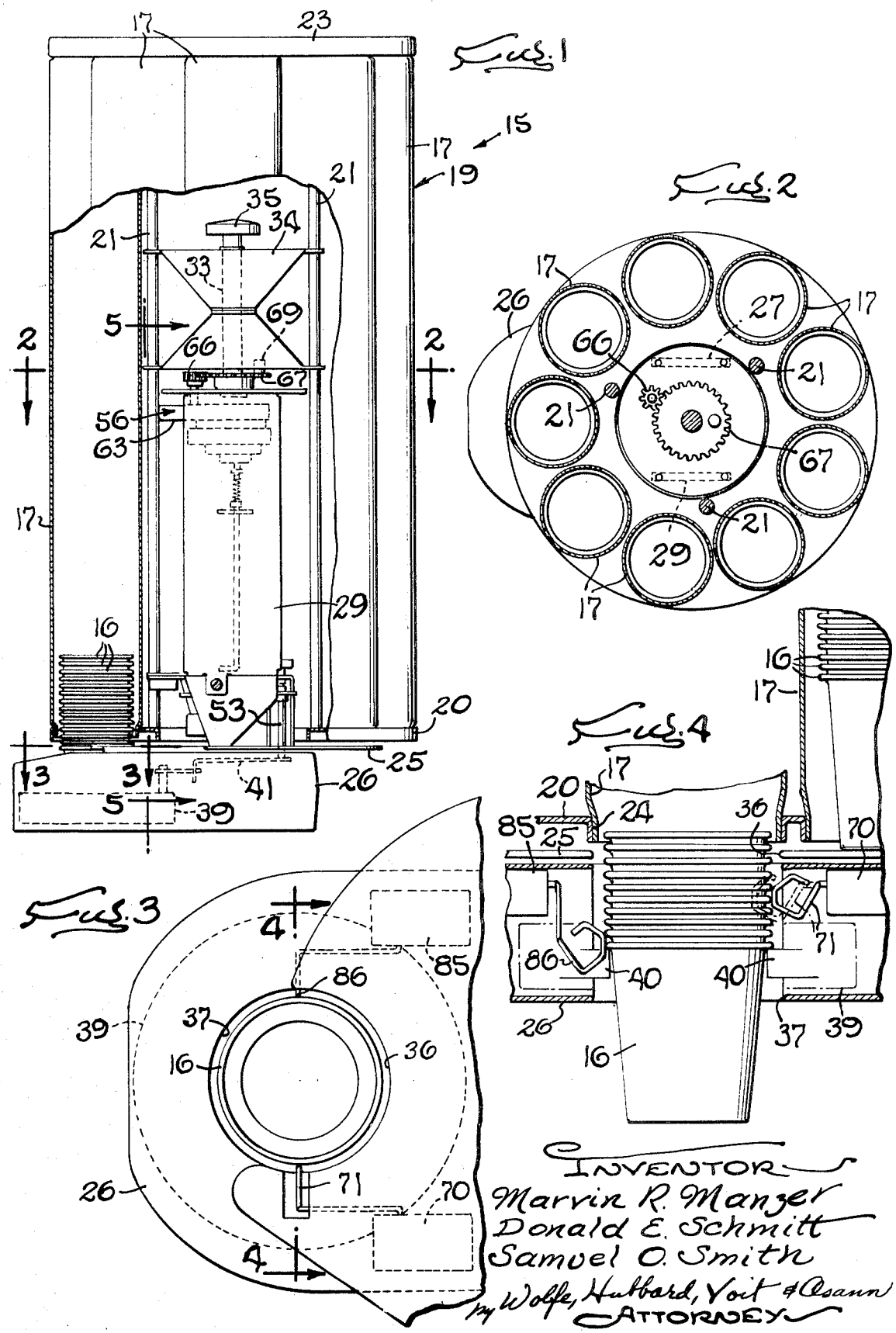

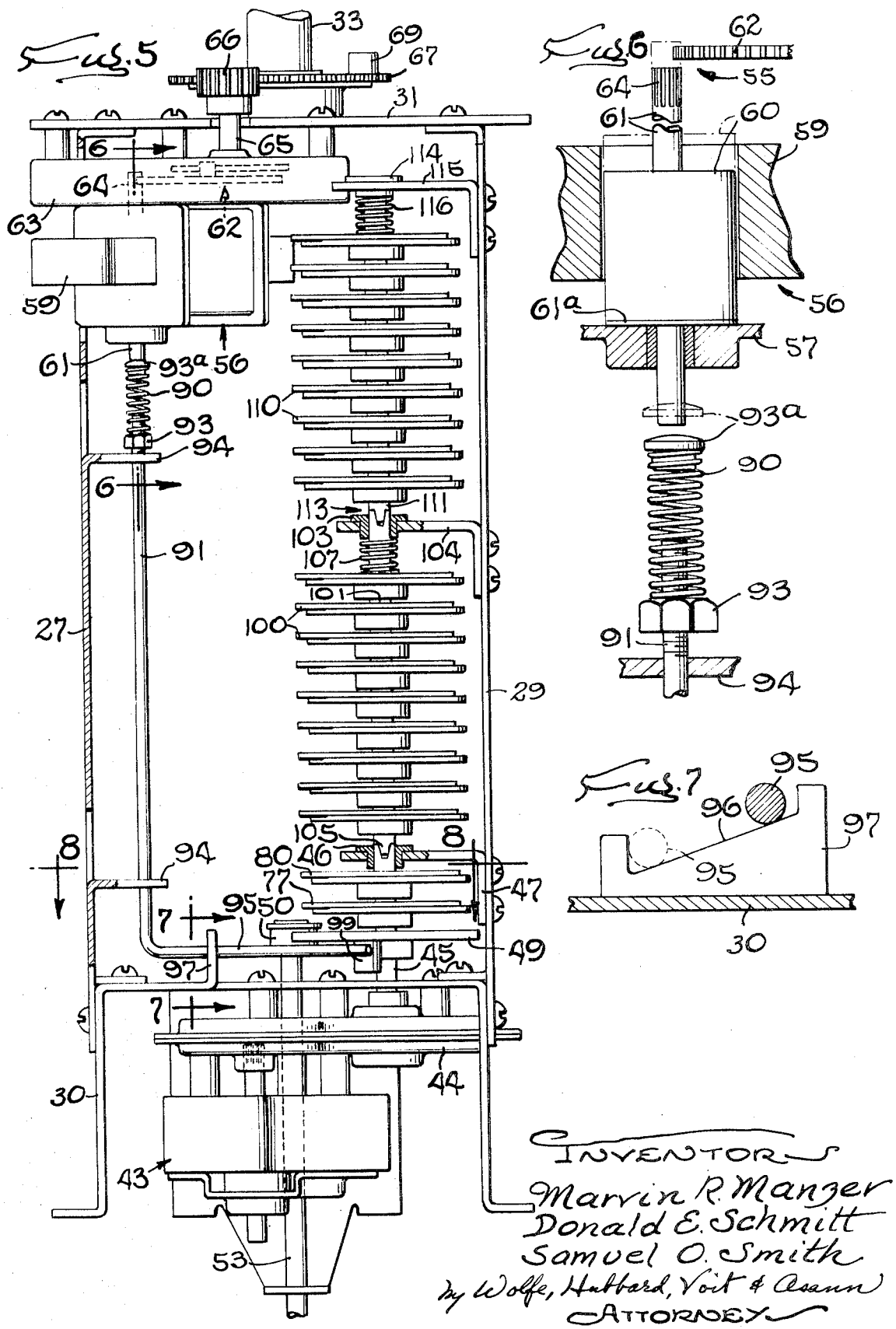

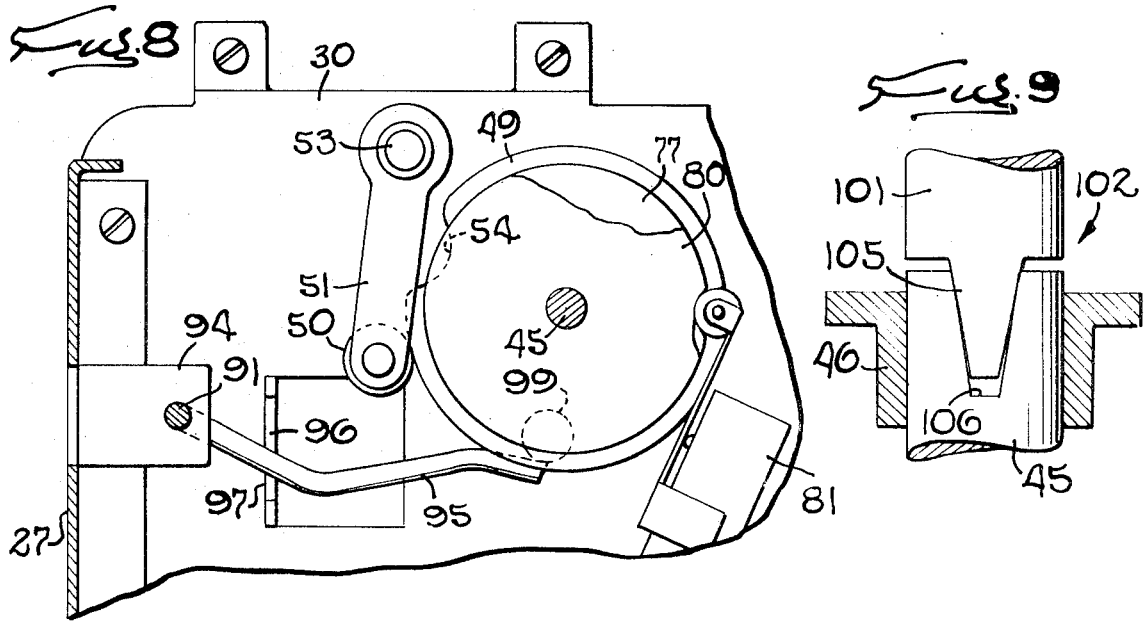
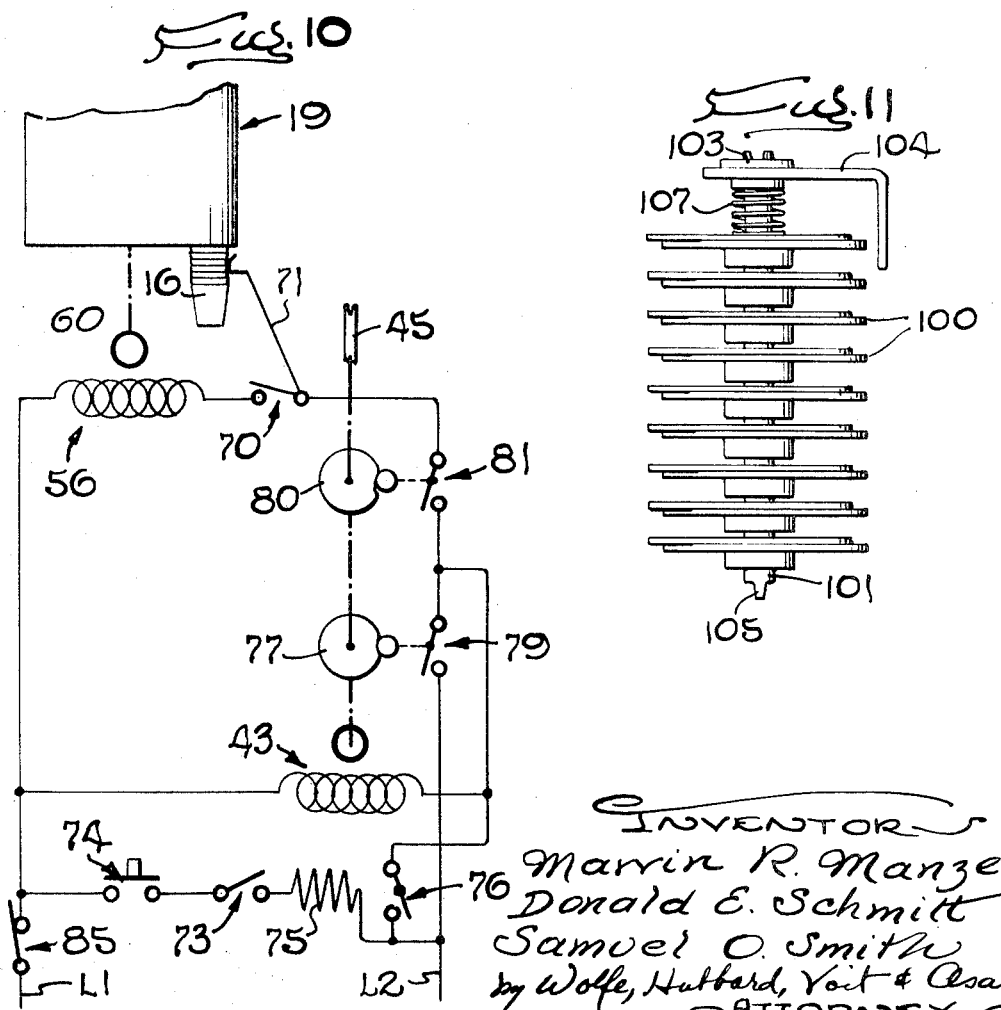

3,520,444
CUP DISPENSING DEVICE WITH AUTOMATIC STACK REPLACEMENT
Marvin R. Manzer, Donald E. Schmitt, and Samuel O. Smith, Rockford, Ill., assignors to Reed Electromech Corp., Rockford, Ill., a corporation of Delaware
Filed Sept. 26, 1968, Ser. No. 762,747
Int. Cl. G07f 11/12
U.S. Cl. 221—11                    16 Claims

ABSTRACT OF THE DISCLOSURE

For dispensing cups in an automatic vending machine, a rotatable turret carries a series of angularly spaced tubes adapted to hold upright stacks of nested cups and successively registrable with a dispensing opening when the turret is indexed step-by-step, the cups in each registering tube dropping into the opening and being dispensed one-by-one as purchases are made. After a registering tube is emptied of cups, an electric motor indexes the turret through approximately one step to advance the next tube into registry with the dispensing opening and, immediately after the lowermost cups in such tube have dropped into the opening, the motor is uncoupled from the turret momentarily to allow the latter to turn freely relative to the motor while the cups in the tube automatically center themselves and seek alined positions with respect to the opening. Thereafter, the motor is re-coupled to the turret to retard free rotation of the turret and prevent inadvertent turning of the turret between the dispensing of successive cups, but is uncoupled from the turret momentarily as each cup is dispensed so that the cups in the registering tube may re-aline themselves with the opening.

Control cams for governing the operation of the vending machine are housed optionally in the otherwise unused space between the tubes, are rotated in timed relation with the dispensing of the cups by the same motor used to effect release of the cups from the opening, and are mounted on shafts which are releasably coupled to such motor in a manner reducing shaft misalignment while effecting a torsionally stiff drive.

BACKGROUND OF THE INVENTION

This invention relates to a device for dispensing stacked articles and more particularly to a device adapted for use with an automatic vending machine for dispensing stacked food or beverage cups. Typical devices of this type include a rotatable turret which carries a series of angularly spaced holders adapted to store upright stacks of nested cups and operable as an incident to intermittent indexing of the turret to register consecutively with a cup dispensing opening formed in a base underlying the turret. Each time a holder registers with the dispensing opening, the lowermost cups of the stack in the holder drop downwardly into the opening and are released one-by-one to the vending machine as successive purchases are made to operate the dispenser through successive cycles, the cups in the stack shifting progressively downwardly into the opening each time a cup is released. When the holder is empty, an electric motor indexes the turret automatically through one step to advance another holder into registry with the dispensing opening and to allow the lowermost cups in such holder to drop into the opening. After the cups have dropped, the turret is allow to turn freely or to free-wheel to enable the cups in the holder to aline themselves automatically with respect to the opening.

SUMMARY OF THE INVENTION

One of the primary objects of the present invention is to disable the free-wheeling action of the turret and to apply a retarding force to the turret between successive cup dispensing cycles to guard against inadvertent turning of the turret and resulting crushing of the cups located between the opening and the registering holder.

A more detailed object is to utilize the same motor which indexes the turret for also applying the retarding force.

A further object is to remove the retarding force each time a cup is dispensed so that the cups shifting downwardly in the registering holder may re-aline themselves with the dispensing opening if such re-alinement should be necessary.

The invention also resides in the novel and relatively trouble-free mechanism employed for applying and removing the retarding force at the proper times.

Another important object of the invention is to optionally utilize otherwise wasted space between the holders to house rotary control apparatus for governing the operation of the vending machine, to rotate such apparatus with the same drive mechanism used for dispensing the cups, and, at the same time, to maintain a torsionally stiff but laterally flexible drive between the control apparatus and the drive mechanism to keep the two accurately timed while eliminating the necessity of supporting the control apparatus in a precisely located position relative to the drive mechanism. This feature of the invention is also characterized by a novel coupling between the control apparatus and the drive mechanism to produce a torsionally stiff but laterally flexible drive between the two.

Other objects and advantages of the invention will become apparent from the following detailed description when taken in conjunction with the accompanying drawings.

BRIEF DESCRIPTION OF THE DRAWINGS

FIG. 1 is a fragmentary side elevation of a new and improved cup dispensing device embodying the novel features of the present invention, parts of the turret and the holders being broken away for purposes of clarity.

FIG. 2 is a cross-section taken substantially along the line 2—2 of FIG. 1.

FIG. 3 is an enlarged fragmentary cross-section taken substantially along the line 3—3 of FIG. 1.

FIG. 4 is a fragmentary cross-section taken substantially along the line 4—4 of FIG. 3.

FIG. 5 is an enlarged fragmentary cross-section taken substantially along the line 5—5 of FIG. 1.

FIG. 6 is an enlarged fragmentary cross-section taken substantially along the line 6—6 of FIG. 5.

FIG. 7 is an enlarged fragmentary cross-section taken substantially along the line 7—7 of FIG. 5.

FIG. 8 is an enlarged fragmentary cross-section taken substantially along the line 8—8 of FIG. 5.

FIG. 9 is an enlarged elevation of parts shown in FIG. 5.

FIG. 10 is a schematic view and an electrical circuit diagram of the dispensing device.

FIG. 11 is a side elevation of part of the vending machine control apparatus shown in FIG. 5.

DESCRIPTION OF THE PREFERRED EMBODIMENT

As shown in the drawings for purposes of illustration, the invention is embodied in a device 15 for dispensing stacked articles from an automatic vending machine (not shown) as an incident to a customer making a purchase by depositing one or more coins. In this particular instance, the articles are lipped cups 16 which are dropped one at a time into the delivery compartment of the vending machine and are filled with various beverages, soups or the like when a purchase is made.

The cup dispenser 15 is housed within the cabinet of the vending machine and includes a series of cup holders in the form of upright tubes 17 each adapted to store a stack of cups 16 in nested relationship. The tubes are carried by and arranged in a circle on a rotatable turret 19 which comprises a lower circular ring 20 and an upper circular ring (not shown) tied together by vertically extending rods 21, a cover 23 being telescoped over the upper ring and being removable to permit loading of cups into the tubes. Being arranged in a circle, the tubes define an upright hollow column between the two rings. As shown most clearly in FIG. 4, the lower ends of the tubes are fitted into holes 24 in the lower ring 20 of the turret and overlie a ring-like cup retaining disc 25 which is fixed stationarily to a supporting base 26 located beneath the turret.

To mount the turret 19 for rotation, two upstanding frame plates 27 and 29 (FIG. 5) project upwardly from a pedestal 30 on the base 26, extend into the column defined by the tubes 17, and are topped by a flat disc 31 which supports a fixed vertical spindle 33. The latter projects upwardly through and is received rotatably in a spider 34 (FIG. 1) fastened securely to the tie rods 21 and held releasably on the spindle by a locking knob 35 threaded onto the upper end of the spindle. Thus, the turret is mounted to rotate with the spider and to turn about the spindle relative to the base. By taking off the locking knob, the turret may be removed from the spindle and pulled away from the base to permit servicing of mechanism (to be described below) housed within the column defined by the tubes 17. The base is hinged within the cabinet of the vending machine such that the entire dispensing device 15 may be swung outwardly of the cabinet for purposes of servicing the device and filling the tubes with cups 16.

The turret 19 is adapted to be indexed step-by-step about the spindle 33 through steps approximately equal in angular length to the spacing between the tubes 17, Each time the turret dwells, one of the tubes registers with a hole 36 (FIGS. 3 and 4) in the cup retaining disc 25 to allow the lowermost cups 16 of the stack in the registering tube to drop downwardly through the hole and into a vertically alined cup dispensing opening 37 formed through the base 26. Escapement mechanism in the cup dispensing opening catches the dropped cups and then operates through successive cup dispensing cycles to release the cups one-by-one into the delivery compartment of the vending machine as successive purchases are made, the cups in the tubing shifting progressively downwardly into the dispensing opening each time a cup is released. In this instance, the escapement mechanism is identical to that disclosed in U.S. Pat. 3,071,292 and includes a ring 39 (FIG. 4) housed within the base and pivotally mounting a series of angularly spaced cams or lugs 40 which project radially into the dispensing opening in underlying relation with the lip of the lowermost cup in the opening. An actuator lever 41 (FIG. 1) is connected operably to the lugs as disclosed fully in the above patent and acts to turn the lugs first away from the cups and then back toward the cups upon being oscillated back and forth when a purchase is made. In this way, the lugs release and drop the lowermost cup in the dispensing opening into the delivery compartment of the vending machine and then return to catch the lip of the next succeeding cup and to hold such cup in the dispensing opening until another purchase is made. The extent to which the lugs project into the dispensing opening may be adjusted within a wide range to enable the dispensing of cups of various types and sizes.

To oscillate the actuator lever 41 back and forth in order to cause the lugs 40 to dispense the cups 16, drive mechanism in the form of an electric motor 43 (FIG. 5) is suspended beneath the pedestal 30 and acts through reduction gearing 44 to rotate a cycle shaft 45 each time a purchase is made. The cycle shaft extends upwardly through the pedestal and is journaled at its upper end in a sleeve bearing or bushing 46 fastened within a hole in a bracket 47 on the side plate 29. Fast on the cycle shaft is a cam 49 (FIG. 8) which rotates past a follower 50 journaled on the free end of a crank 51 fastened to a vertical shaft 53 (see FIGS. 1 and 5) projecting downwardly through the pedestal and coupled to the actuator lever 41. When a purchase is made, the cup dispense motor 43 is energized momentarily to turn the cycle shaft 45 through one revolution and to cause a fall 54 (FIG. 8) in the cam 49 to rotate past the follower 50. As the latter drops into and rises out of the fall, the shaft 53 and the lever 41 are oscillated back and forth to cause the cup retaining lugs 40 to dispense one cup and to catch the next succeeding cup. A spring (not shown) acts on the follower and keeps the follower pressed against the cam.

After the last of the cups 16 in the tube 17 registering with the dispensing opening 37 has shifted downwardly into the opening, the turret 19 is indexed automatically through one step in a clockwise direction (FIG. 2) to advance the next succeeding tube into registry with the opening and thereby allow the lowermost cups in such tube to drop into the opening into nested relationship with a few cups which remain in the opening. Upon depletion of the cups in the new stack, the turret again is indexed to advance still another loaded tube into registry with the dispensing opening.

In accordance with one of the main aspects of the present invention, the turret 19 is indexed positively to advance the loaded tubes 17 into substantial registry with the dispensing opening 37, is allowed to turn freely after the lowermost cups 16 in each registering stack have been dropped into the opening to enable the stack to center itself automatically with respect to the opening, and then is restricted against free rotation to prevent subsequent inadvertent turning of the turret and crushing of the cups disposed between the registering tube and the opening. To these ends, a coupling 55 (FIG. 6) connects a unique indexing mechanism 56 to the turret to turn the latter sufficiently far to allow the cups in the advancing tube to drop into the dispensing opening, and then releases the turret from the indexing mechanism to allow the turret to turn freely or free-wheel in either direction while the cups in the tube and the cups in the opening aline themselves vertically with one another and assume properly centered positions relative to the opening. The indexing mechanism thereafter is disabled and is re-connected to the turret by the coupling to hold the turret in a fixed position and to restrict turning of the turret between successive cup dispensing cycles.

In this specific instance, the indexing mechanism 56 (FIGS. 5 and 6) comprises an electric motor suspended from the underside of the disc 31 and including a frame 57 supporting a stator 59 within which an armature 60 with a drive shaft 61 is both rotatably and slidably telescoped. The exemplary motor is sold by Electro-Counter and Motor Co. of Chicago, Ill., as Model D1–M1, and includes a field winding (not shown) which surrounds the armature and which, when excited upon energization of the motor, is operable not only to rotate the armature but also to shift the armature upwardly in an axial direction within the stator. When the motor is de-energized, the armature is pulled downwardly within the stator by gravity and its rotation is arrested by a friction disc 61a which is located on the motor frame 57 to engage and rub against the lower end of the armature.

The coupling 55 between the index motor 56 and the turret 19 is formed by the input gear of a train of reduction gears 62 (FIGS. 5 and 6) within a gear box 63 on the underside of the disc 31, and by a drive element in the form of a splined upper end 64 of the motor drive shaft 61. When the motor 56 is energized and the armature 60 is shifted upwardly within the stator 59, the splined end 64 of the shaft meshes with and drives the input gear of the gearing 62 to turn an output shaft 65

(FIG. 5) projecting upwardly from the gear box 63 through the disc 31 and carrying a pinion 66 which meshes with a gear 67 rotatably mounted on the spindle 33. A drive pin 69 projecting upwardly from the upper side of the gear 67 is bushed in the spider 34 and serves to index the turret positively when the gear is turned as an incident to energization of the index motor. When the motor is de-energized to permit the armature to drop downwardly within the stator, the splined end 64 of the drive shaft 61 shifts downwardly out of meshing engagement with the gearing 62 to allow the latter to free-wheel with respect to the motor and to permit the turret to turn freely in either direction as the cups 16 in the registering tube 17 seek alinement with the cups in the dispensing opening 37.

Energization and de-energization of the turret index motor 56 is controlled by detecting means in the form of a switch 70 (FIGS. 3 and 4) operable to sense the cups 16 in the dispensing opening 37 and to produce a signal energizing the index motor after any particular tube 17 registering with the opening has been emptied of cups. As shown in FIGS. 3 and 4, the index switch is mounted within the base 26 and includes a wire actuator 71 which is spring-urged into the dispensing opening. As long as the switch actuator engages cups in the opening, the switch is held open to keep the index motor de-energized. After the registering tube has been emptied and only a few (e.g., three) cups remain in the dispensing opening, the actuator, being located above the remaining cups, is permitted to shift inwardly into the opening (as shown in phantom in FIG. 4) to close the switch. Closure of the switch energizes the motor 56 to index a new stack of cups into registry with the dispensing opening. When the lowermost cups of the new stack drop into the opening, the actuator again is forced outwardly to open the switch and produce a second signal de-energizing the motor.

To help explain the operation of the dispensing device 15 as described thus far, reference is made to FIG. 10 which shows a schematic circuit diagram for controlling the energization and de-energization of the cup dispense motor 43 and the turret index motor 56, the two motors being shown connected across AC power lines L1 and L2. Let it be assumed that initially the tube 17 registering with the dispensing opening 37 is loaded with cups 16 such that the index switch 70 is held in an open condition to keep the index motor 56 de-energized.

When a purchase is made to initiate one cycle of operation of the dispensing device 15, a coin-operated switch 73 (FIG. 10) and a manually operable product selector switch 74 associated with the vending machine are closed momentarily to energize a relay 75 which serves to close a switch 76. Closure of the switch 76 energizes the cup dispense motor 43 which turns the cycle shaft 45 to cause one cup 16 to be dispensed as a result of the cam 49 effecting oscillation of the actuator lever 41 to retract the cup retaining lugs 40 away from the lowermost cup in the dispensing opening 37. As an incident to initial rotation of the cycle shaft 45, a timing cam 77 (FIGS. 5 and 10) fast on the shaft closes a switch 79 to set up a holding circuit sealing in the relay 75 to keep the switch 76 closed and the motor 43 energized when the coin and selector switches 73 and 74 are subsequently opened. When the cycle shaft 45 has completed one revolution to allow the lugs 40 to drop one cup and to catch the next succeeding cup, the cam 77 opens the switch 79 to de-energize the cup dispense motor 43 until the next purchase is made. As the cycle shaft 45 rotates, an additional cam 80 (FIGS. 5 and 10) on the shaft closes and then opens a switch 81 connected in series with the index motor 56 and the index switch 70 but, as long as a sufficient number of cups remain in the dispensing opening 37 to hold the latter switch open, the index motor stays de-energized and the turret remains stationary.

The same cycle is repeated upon each subsequent purchase until the registering tube 17 is emptied of cups 16 and until a dispensing cycle is begun which allows the uppermost cup in the dispensing opening 37 to drop below the switch actuator 71 to permit the index switch 70 to close. With the switch 70 thus being closed and with the switches 79 and 81 already closed by the timing cams 77 and 80, a circuit is completed to the index motor 56 to energize the latter. Upon being energized, the index motor drives the turret 19 in a positive manner through the coupling 55 formed by the splined shaft end 64 and the gearing 62 and starts indexing the turret through one step to advance the next loaded tube toward the dispensing opening, the lowest cup in the advancing tube riding along the retaining disc 25 during such movement. Upon registering with the hole 36 in the disc, the cups in the advancing tube shift downwardly such that the lowermost cups in the stack fall into the dispensing opening 37 into nested relation with the cups remaining in the opening and engage the switch actuator 71 to open the index switch 70 and de-energize the index motor 56.

When the index motor 56 is de-energized, the armature 60 immediately shifts downwardly within the stator 59 (as shown in FIG. 6) to uncouple the splined shaft end 64 from the gearing 62 thereby to allow the turret 19 to free-wheel with respect to the motor. As a result, the turret is free to rotate in either direction and thus the stack of nested cups 16 in the registering tube 17 may work the turret back and forth to whatever extent may be necessary to effect perfect alinement between the cups in the tube and the cups in the dispensing opening 37. Thus, there is little danger of the cups becoming improperly alined and jamming in the opening even if the stack initially was inclined or skewed vertically in the tube or if the cups failed to drop into the opening until after the center of the tube had rotated past the center of the opening. When the cycle shaft 45 completes its one revolution, the switches 76, 79 and 81 are opened, and the cup dispense motor 43 is de-energized until the next purchase is made.

In carrying out the invention, a retarding force is applied to the turret 19 between each index to protect against the turret being turned inadvertently and causing crushing or misalinement of the cups in the dispensing opening 37 and the registering tube 17. In this instance, the retarding force is applied by re-engaging the splined shaft end 64 with the gearing 62 shortly after the completion of each index so that the index motor 56 itself may serve to restrict free rotation of the turret.

Herein, the splined end 64 is advantageously re-engaged with the gearing 62 by a resiliently yieldable element in the form of a coil spring 90 (FIGS. 5 and 6) which underlies the lower end of the index motor shaft 61 and which is retained on the extreme upper end of a threaded rod 91 by a nut 93, the spring being cantilevered on the rod and being closed at its free end by a plug 93a. Two brackets 94 on the side plate 27 guide the rod for up and down sliding and journal the rod for back and forth turning about its own axis. The lower end portion of the rod is formed with an arm 95 (FIGS. 5, 7 and 8) bent inwardly toward the cycle shaft 45, extending across an upwardly inclined surface 96 of a cam 97 fixed to the pedestal 30, and projecting into the path of an eccentric pin 99 (FIG. 8) depending from the cam 49 on the cycle shaft.

Normally and when the dispensing device 15 is at rest between successive cup dispensing cycles, the pin 99 engages the arm 95 and holds the latter in an upper position on the cam surface 96 as shown in full in FIG. 7 thereby to keep the rod 91 forced upwardly within the brackets 94. In the upper position of the rod, the plug 93a in the spring 90 engages the lower end of the motor shaft 61 to hold the armature 60 upwardly within the stator 59 and to keep the splined end 64 coupled to the gearing 62. Free rotation of the turret thus is restricted by the motor. When a purchase is made to initiate a cup dispensing cycle, the pin 99 turns with the cam 49 and away from the arm 95 to allow the latter to slide downwardly along the cam surface (as shown in phantom in FIG. 7) under the urging of the compressed spring 90. The rod 91 thus turns and shifts downwardly within the brackets 94 to retract the spring away from the shaft 61.

If, during a particular dispensing cycle, cups 16 remain in the registering tube 17 such that the index motor 56 remains de-energized, the retracted spring 90 allows the armature 60 to shift downwardly momentarily to uncouple the splined end 64 and the gearing 62 while the lower cup is being dispensed. During this time, the turret 19 thus is advantageously free to turn in either direction under the influence of the cups progressing downwardly from the tube into the dispensing opening 37 and, if the downwardly shifting cups are skewed in the tube and not perfectly alined with the opening, the freely turnable turret will be worked back and forth by the cups to allow the cups to seek proper alinement. As the cup dispensing cycle ends and the cycle shaft 45 completes one revolution, the pin 99 re-engages the arm 95 and shifts the rod 91 and the spring 90 upwardly to re-couple the splined end and the gearing so that the index motor 56 thereafter may retard free rotation of the turret until the next cup dispensing cycle. Thus, when the vending machine or the cup dispensing device is serviced, there is no danger of the turret being inadvertently bumped and turned by the serviceman to cause crushing or shearing of the cups located in the area of the dispensing opening and the registering tube. Also, the turret cannot turn when the dispensing device is swung out of the vending machine cabinet for servicing or filling.

Should the indexing motor 56 happen to be energized during a particular cup dispensing cycle, the splined end 64 and the gearing 62 simply will remain coupled to index the turret 19, regardless of the position of the spring 90, since the energized motor holds the armature 60 in its upper or active position. Once the index motor is de-energized, however, the retracted spring permits the armature to shift downwardly to its lower or inactive position to uncouple the splined end and the gearing thereby to allow the turret to free-wheel while the new stack of cups 16 is alining itself. As before, the rod 91 and the spring 90 are returned to their upper positions when the cycle shaft 45 completes one revolution thereby to re-couple the splined end and the gearing so that the index motor thereafter may retard free rotation of the turret.

It should be noted that the spring 90, being flexible, does not shift the splined end 64 forcibly into engagement with the gearing 62 but, instead, yields and allows the rod 91 to continue to shift upwardly if the splined end is turned such that its flutes will not mesh with the teeth of the gearing. Thus, the spring prevents the splined end and the gearing from being damaged and prevents the rod from being bent. Moreover, even if the splined end does not mesh with the gearing, the spring presses the upper face of the splined end against the lower face of the gearing to create a frictional force retarding rotation of the turret 19 between cup dispensing cycles.

As shown most clearly in FIGS. 3 and 10, a so-called sold out switch 85 connected into the line L1 is mounted within the base 26 adjacent the dispensing opening 37 and includes a wire actuator 86 which is spring-urged into the opening into engagement with the lowermost cup 16 therein. As long as a single cup remains in the opening, the sold out switch is held closed to enable normal operation of the dispensing device 15. If, however, all of the cups in the opening are dispensed as would be the case after all of the tubes 17 were emptied, the sold out switch opens to disable the dispending device and the vending machine and to cause the return to the purchaser of all coins deposited into the machine. The actuator 86 of the sold out switch 85 herein is located three cups below the actuator 71 of the index switch 70 and, as a result, the dispensing device will continue to cycle until the remaining three cups are delivered even though no additional cups are dropped into the opening from the tubes. That is, the cup dispensing motor 43 will operate through three additional cycles to dispense the three remaining cups, and the turret 19 will continue to index to advance more tubes into registry with the dispensing opening regardless of whether new stacks of cups are dropped into the opening.

The ability of the dispensing device 15 to continue to operate through a few cycles even though new stacks of cups 16 are not delivered to the dispensing opening 37 is important in case the serviceman should neglect to load some of the tubes 17 with any cups. Should one or two unloaded tubes happen to be indexed into registry with the dispensing opening during a particular dispensing cycle, the index and sold out switches 70 and 85 simply will remain closed and, during the same cycle, the turret will index through a further step to advance still another tube into registry with the dispensing opening. If this tube is loaded, the cups therein will drop into the opening and will enable continued operation of the dispensing device. Thus, the device will not shut down prematurely if some of the tubes are not initially loaded with cups.

As pointed out above, the index switch 70 will not be opened to de-energize the index motor 56 if an unloaded tube 17 should happen to be indexed into registry with the dispensing opening 37. By the time the next loaded tube is indexed into registry with the opening and has dropped its cups to open the index switch and de-energize the index motor, the cycle shaft 45 may be simultaneously nearing the end of its one revolution to cause the pin 99 to force the rod 91 and the spring 90 upwardly to re-engage the splined end 64 with the gearing 62. To insure that the splined end will not be re-engaged with the gearing while the armature 60 of the de-energized motor 56 is coasting to a stop, the cam 80 is timed to open the switch 81 a few seconds before the cycle shaft completes one revolution. Thus, regardless of the exact time that the cups are dropped into the opening, there is no possibility that the splined end will be turning when re-engaged with the gearing since the index motor is always de-energized independently of the index switch 70 by the cam 80 and the switch 81 a few seconds before the pin 99 forces the rod 91 and the spring 90 upwardly. Accordingly, possible damage to the splined end and the gearing is avoided, and there is no danger of the inertia of the coasting motor overindexing the loaded tube past the dispensing opening 37 and causing crushing or jamming of the cups.

As is typical of prior cup dispensers, otherwise wasted space within the column defined by the tubes 17 is utilized optionally to house control apparatus for governing different operations of the vending machine thus enabling such apparatus to be built into the dispensing device 15 rather than in the vending machine itself. Moreover, the cup dispense motor 43 is employed to drive the control apparatus in timed relation with the dispensing of the cups 16 to avoid the need of using and synchronizing a separate drive motor with the cup dispense motor.

Herein, the vending machine control apparatus comprises a cluster of cams 100 (FIGS. 5 and 11) which may be selectively driven by the cycle shaft 45. Nine control cams 100 are used in this instance and are operable in response to rotation of the shaft to open and close various electrical switches (not shown) for controlling such functions as the dispensing of coffee, sugar, cream, syrup and the like from the vending machine.

According to another important aspect of the present invention, the control cams 100 are mounted on their own separate shaft 101 (FIGS. 5 and 11) which is connected releasably to the cycle shaft 45 by a unique and relatively inexpensive coupling 102 (FIG. 9) adapted to maintain a torsionally stiff drive between the shafts while permitting the shafts to aline themselves laterally with one another. If it is desired to incorporate the control cams in the dispensing device 15, the upper end of the shaft 101 is journaled in a sleeve bearing or bushing 103 (FIG. 5) supported in a hole in a bracket 104 which is attached to the side plate 29 about midway along the length of the latter. At its lower end, the shaft 101 is connected to the upper end of the cycle shaft 45 such that the cams 100 are located between the side plates 27 and 29 and within the column defined by the tubes 17.

For connecting the cycle shaft 45 and the cam shaft 101, the coupling 102 comprises a flat-sided male taper 105 (FIG. 9) projecting downwardly from the lower end of the cam shaft into the bushing 46 and telescoped with a non-rotatable fit into an open-sided tapered socket 106 formed in the upper end of the cycle shaft. A coil spring 107 (FIG. 5) telescoped over the upper end portion of the cam shaft 101 and compressed against the underside of the bushing 103 urges the taper into yieldable seating engagement with the socket and prevents longitudinal separation of the two shafts.

Preferably, the taper angle of the male taper 105 is just slightly different than that of the female socket 106, as shown in FIG. 9, and the taper and socket are sized such that the taper wedges into the socket without its lower end engaging the bottom of the socket and without the opposing ends of the two shafts 45 and 101 abutting one another. This relationship, together with the spring 107 urging the taper into seating engagement with the socket, enables the taper to seek and assume a vertical running position in which it drivingly contacts the socket along a line extending around its entire periphery, and yet does not wedge into the socket with its sides in full face-to-face engagement with the sides of the socket. As a result, the coupling 102 is torsionally stiff to prevent rotary play between the shafts and thereby insure that the cams 100 will rotate precisely in phase with the cycle shaft 45 to effect accurate timing of the operations of the vending machine. At the same time, the relative taper angles of the taper and the socket cause the coupling to be laterally flexible to a degree to enable the shaft 101 to pivot laterally relative to the shaft 45 and aline itself in the bushings 46 and 103. Thus, if the bushings are not in perfect vertical alinement or if the bushings are not identically sized, the shaft 101 may pivot slightly relative to the shaft 45 to seek an alined running position without being laterally stressed and without adversely cocking the control cams. Radial separation of the taper from the socket is prevented by the bushing 46 and thus the drive between the two shafts is both radially and torsionally stiff but is laterally flexible. The taper and the open-sided socket may be manufactured at relatively low cost and enable quick and easy coupling of the cam shaft to the cycle shaft if it is desired to incorporate the control cams 100 into the dispensing device 15.

A second cluster of control cams 110 (FIG. 5) mounted on a shaft 111 also may be built optionally into the dispensing device 15 if the vending machine requires the controlling of a large number of functions. If the cams 110 are used, the lower end of the shaft 111 is connected to the upper end of the shaft 101 by a taper-socket coupling 113 identical to the coupling 102, the upper end of the shaft is journaled in a bushing 114 supported by a bracket 115 attached to the upper end portion of the side plate 29, and a coil spring 116 is telescoped over the upper end portion of the shaft to keep the taper of the coupling 113 seated in the socket. Like its counterpart, the coupling 113 maintains a torsionally stiff drive between the shafts 101 and 111 and flexes laterally to allow alinement of the shaft 111 in the bushings 103 and 114 if the bushings are not perfectly centered on a common vertical line.

What is claimed is:

1. In a cup dispenser, the combination of, a base having a cup dispensing opening extending downwardly therethrough, a turret disposed above and rotatable relative to said base and carrying a series of downwardly opening holders for storing upright stacks of nested cups, the holders being spaced angularly from one another and being positioned to register successively with said dispensing opening as an incident to rotation of said turret whereby the lowermost cups of the stack in each holder drop into the opening for subsequent dispensing when such holder moves into registry with the opening, an indexing motor, a releasable coupling between said motor and said turret and operable when engaged to rotate the latter to advance one of the holders toward registry with the dispensing opening in response to energization of the motor, detecting means operable to produce a signal as an incident to the lowermost cups of the registering holder dropping into said opening, means responsive to said signal for releasing said coupling to allow said turret to turn freely relative to said motor and thereby enable the cups stacked in the opening and in the registering holder to aline themselves automatically, and mechanism operable to retard rotation of said turret shortly after release of said coupling thereby to restrict free turning of the turret.

2. A cup dispenser as defined in claim 1 in which said mechanism is operable to re-engage said coupling shortly after release of the coupling to cause said motor to retard rotation of said turret.

3. A cup dispenser as defined in claim 2 in which said detecting means is operable to produce a second signal after the depletion of the cups in the registering holder, said motor being energized in response to said second signal and including a rotatable armature shiftable axially in one direction to an active position as an incident to energization of the motor, said motor being de-energized in response to said first signal and freeing said armature to shift axially in the other direction to an inactive position, said coupling comprising a drive element on said armature and connected to said turret when said armature is in said active position, said drive element being disconnected from said turret when said armature is in said inactive position, and said mechanism being operable to shift said armature back to said active position shortly after de-energization of said motor thereby to re-connect said drive element to said turret.

4. A cup dispenser as defined in claim 1 in which said motor is responsive to said signal and de-energizes upon creation of the signal, and said mechanism being operable to re-engage said coupling shortly after de-energization of the motor to cause said motor to retard rotation of the turret.

5. In an article dispenser, the combination of, a base having an article dispensing opening extending downwardly therethrough, a turret disposed above and rotatable relative to said base and carrying a series of downwardly opening holders for storing upright stacks of articles, the holders being spaced angularly from one another and being positioned to register successively with said dispensing opening as an incident to rotation of said turret whereby the lowermost articles of the stack in each holder drop into the opening for subsequent dispensing when such holder moves into approximate registry with the opening, an indexing motor having a drive element movable into coupling relation with said turret to rotate the latter positively after depletion of the articles in a registering holder and releasable from the turret after the articles in an advancing holder have dropped into the opening thereby to allow the turret to turn freely relative to the motor and to enable the articles in the opening and the holder to aline themselves automatically, escapement mechanism in the opening for holding the articles therein and selectively operable through successive cycles to dispense the articles one-by-one from the opening with the articles in the registering holder shifting progressively downwardly into the opening upon the dispensing of each article, and mechanism for applying a retarding force to said turret at all times except when said escapement mechanism is being operated and except when said turret is being positively rotated by said drive element whereby inadvertent turning of the turret between successive article dispensing cycles is restricted and yet the turret is free to turn during such a cycle to allow the downwardly shifting articles to aline themselves with said opening.

6. In a cup dispenser, the combination of, a base having a cup dispensing opening extending downwardly therethrough, a turret disposed above and rotatable relative to said base and carrying a series of downwardly opening holders for storing upright stacks of nested cups, the holders being spaced angularly from one another and being positioned to register successively with said dispensing opening as an incident to rotation of said turret whereby the lowermost cups of the stack in each holder drop into the opening when such holder moves into approximate registry with the opening, escapement mechanism in the opening for holding the cups therein and operable when actuated through successive cycles to dispense the cups one-by-one from the opening with the cups in the registering holder shifting progressively downwardly into the opening upon the release of each cup, a drive motor connected to said escapement mechanism and selectively energizable to actuate the escapement mechanism, cup detecting means in said opening operable to produce a first signal after depletion of the cups in the registering holder, an indexing motor energizable in response to said first signal, a releasable coupling between said indexing motor and said turret and operable when the indexing motor is energized to rotate the turret to advance the next holder into approximate registry with the dispensing opening, said detecting means responding to the cups in the next holder dropping into said opening and producing a second signal, means responsive to said second signal for releasing said coupling thereby to allow said turret to turn freely relative to said indexing motor to enable the cups stacked in the opening and the registering holder to aline themselves automatically, mechanism for applying a retarding force to the turret except when said drive motor is energized thereby to restrict free rotation of the turret between successive cup dispensing cycles, and means releasing said retarding mechanism from said turret in response to energization of said drive motor thereby to leave the turret free to turn during a cup dispensing cycle.

7. In an article dispenser, the combination of, a base having an article dispensing opening extending downwardly therethrough, a turret disposed above and rotatable relative to said base and carrying a series of downwardly opening holders for storing upright stacks of articles, the holders being spaced angularly from one another and being positioned to register successively with said dispensing opening as an incident to rotation of the turret whereby the lowermost articles of the stacks in each holder drop into the opening when such holder moves into approximate registry with the opening, escapement mechanism in the opening and operable when actuated through successive cycles to dispense the articles one-by-one from the opening with the articles in the registering holder shifting progressively downwardly toward the opening upon the release of each article, a drive motor having a rotatable output shaft connected to said escapement mechanism and selectively energizable through an article dispensing cycle to actuate the escapement mechanism, article detecting means in said opening operable to produce a first signal after the depletion of articles in one holder and operable to produce a second signal in response to the lowermost articles in the next succeeding holder dropping into the opening, an indexing motor connected to be energized and de-energized in response to said first and second signals, respectively, and including a rotatable armature shiftable axially in one direction to an active position as an incident to energization of the indexing motor and in the opposite direction to an inactive position as an incident to de-energization of the indexing motor, a drive element movable with said armature and connected to said turret to rotate the latter when said armature is in said active position and when said indexing motor is energized, said drive element being disconnected from said turret when said armature is in said inactive position thereby to allow the turret to turn freely relative to the indexing motor and to enable the articles stacked in the opening and the registering holder to aline themselves automatically, and mechanism connected to the output shaft of said drive motor and operable in response to rotation of said shaft to move first away from said armature to leave the armature free to shift into said inactive position during an article dispensing cycle and then to move toward the armature to shift the latter to said active position to re-connect said drive element with said turret and thereby retard free rotation of the turret between successive article dispensing cycles.

8. An article dispenser as defined in claim 7 in which said last-mentioned mechanism comprises a resiliently yieldable element connected to be reciprocated in response to rotation of said output shaft and operable to press said armature toward said active position when moved toward said armature.

9. An article dispenser as defined in claim 8 in which said drive element comprises a toothed member movable with said armature and slidable into and out of mesh with a second toothed member drivingly connected to said turret, said resiliently yieldable element being operable when moved toward said armature to shift said first toothed member into mesh with said second toothed member and being operable to yieldably press the two members into frictional bearing engagement if the members fail to mesh.

10. An article dispenser as defined in claim 9 further including means responsive to rotation of said output shaft for de-energizing said indexing motor independently of said second signal and before said resiliently yieldable element is moved toward said armature.

11. An article dispenser as defined in claim 7 further including means responsive to rotation of said output shaft for de-energizing said indexing motor independently of said second signal and before said last-mentioned mechanism is moved toward said armature.

12. A cup dispenser for a vending machine and including a base having a cup dispensing opening extending downwardly therethrough, a turret disposed above and rotatable relative to said base, a series of upright holders on said turret for storing stacks of nested cups and adapted to register successively with said dispensing opening in response to intermittent rotation of said turret whereby the lowermost cups of the stack in each holder drop into the opening when such holder registers with the opening, said holders being spaced in a circle around said turret and defining an upright hollow column, escapement mechanism in said opening for holding the cups therein and operable when actuated to release the lowermost cup in the opening, a drive mechanism supported on said base and having a rotatable output shaft projecting into the inside of said column, a first bearing inside of said column and journaling said output shaft for rotation, at least one cam fast on said output shaft and operable when rotated to actuate said escapement mechanism, the improvement in said cup dispenser comprising, an additional shaft located within said column, an additional bearing located within said column and journaling said additional shaft for rotation, a laterally flexible and torsionally stiff coupling releasably connected said shafts in end-to-end relation to prevent rotary play between said shafts while permitting alinement of the shafts in said bearings, and a cluster of cams fastened to and rotatable with said additional shaft and housed within said column for controlling different operations of the vending machine.

13. A cup dispenser as defined in claim 12 in which said coupling comprises a flat-sided male taper projecting from the end of one of said shafts and telescoped non-rotatably into an open-sided tapered socket formed in the opposing end of the other of said shafts, and means acting on one of said shafts for urging said taper into seating engagement with said socket.

14. A cup dispensed as defined in claim 13 in which the taper angle of said taper is different than that of said socket, the taper and the socket being sized to permit seating of the taper in the socket without the free end of the taper engaging the closed end of the socket and without the ends of the two shafts engaging one another.

15. A cup dispenser as defined in claim 13 in which said first bearing surrounds said socket to prevent radial separation of said taper from said socket.

16. A cup dispenser as defined in claim 12 further including a third shaft located within said column, a third bearing located within said column and journaling said third shaft for rotation, a second laterally flexible and torsionally stiff coupling releasably connecting said third shaft and said additional shaft in end-to-end relation, and a second cluster of cams fastened to and rotatable with said third shaft and housed within said column for controlling still further operations of said vending machine.

References Cited

UNITED STATES PATENTS

| | | | |
|---|---|---|---|
| 2,517,532 | 8/1950 | Carew et al. | 221—11 |
| 2,732,098 | 1/1956 | Lime et al. | 221—11 |
| 2,919,830 | 1/1960 | Anderson | 221—11 |
| 2,925,196 | 2/1960 | Stoner | 221—11 X |
| 3,120,324 | 2/1964 | Amberg et al. | 221—11 X |

SAMUEL F. COLEMAN, Primary Examiner